United States Patent
Dazeley et al.

(10) Patent No.: US 8,373,133 B2
(45) Date of Patent: Feb. 12, 2013

(54) GADOLINIUM-DOPED WATER CERENKOV-BASED NEUTRON AND HIGH ENERGY GAMMA-RAY DETECTOR AND RADIATION PORTAL MONITORING SYSTEM

(75) Inventors: Steven A. Dazeley, Oakland, CA (US); Robert C. Svoboda, Davis, CA (US); Adam Bernstein, Palo Alto, CA (US); Nathaniel Bowden, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 124 days.

(21) Appl. No.: 12/784,390

(22) Filed: May 20, 2010

(65) Prior Publication Data
US 2011/0024639 A1     Feb. 3, 2011

Related U.S. Application Data

(60) Provisional application No. 61/179,841, filed on May 20, 2009.

(51) Int. Cl.
*G01T 1/208* (2006.01)
(52) U.S. Cl. ........................................... 250/366
(58) Field of Classification Search .................. 250/366
See application file for complete search history.

(56) References Cited

U.S. PATENT DOCUMENTS

| | | | |
|---|---|---|---|
| 2,954,473 A | 9/1960 | Hoover et al. | |
| 3,560,741 A | 2/1971 | Strindehag | |
| 4,389,568 A | 6/1983 | Dowdy et al. | |
| 4,497,769 A | 2/1985 | Nicholson et al. | |
| 7,601,965 B1 * | 10/2009 | Bell et al. | 250/390.11 |
| 7,629,588 B1 * | 12/2009 | Bell et al. | 250/390.11 |

OTHER PUBLICATIONS

S. Dazeley et. al. "Neutron Detection with Water Cerenkov Based Detectors" May 17, 2009, pp. 1-4.
A. Bernstein et. al, "An Assessment of Antineutrino Detection as a Tool for Monitoring Nuclear Explosions" Science & Global Security, vol. 9 pp. 235-255.
R. Byrd et. al. "Nuclear Detection to Prevent or Defeat Clandestine Nuclear Attack" IEEE Sensors Journal, vol. 5, No. 4, Aug. 2005.

\* cited by examiner

*Primary Examiner* — Marcus Taningco
(74) *Attorney, Agent, or Firm* — James S. Tak

(57) ABSTRACT

A water Cerenkov-based neutron and high energy gamma ray detector and radiation portal monitoring system using water doped with a Gadolinium (Gd)-based compound as the Cerenkov radiator. An optically opaque enclosure is provided surrounding a detection chamber filled with the Cerenkov radiator, and photomultipliers are optically connected to the detect Cerenkov radiation generated by the Cerenkov radiator from incident high energy gamma rays or gamma rays induced by neutron capture on the Gd of incident neutrons from a fission source. The PMT signals are then used to determine time correlations indicative of neutron multiplicity events characteristic of a fission source.

20 Claims, 7 Drawing Sheets

GADOLINIUM-DOPED WATER CERENKOV-BASED NEUTRON AND HIGH ENERGY GAMMA-RAY DETECTOR AND RADIATION PORTAL MONITORING SYSTEM

CLAIM OF PRIORITY IN PROVISIONAL APPLICATION

This application claims priority in provisional application filed on May 20, 2009, entitled "Water Cerenkov Based Neutron and High Energy Gamma-ray Detector" Ser. No. 61/179,841, by Steven A. Dazeley et al, and incorporated by reference herein.

FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to radiation detectors, and more particularly to a compact, modular water Cerenkov-based neutron and high energy gamma ray detector and radiation portal monitoring system using water doped with a Gadolinium-based compound (such as $GdCl_3$) as the Cerenkov radiator, so that incident neutron multiplicities from a fission source may be detected by measuring and time correlating Cerenkov radiation from gamma rays induced by neutron capture on the Gadolinium.

BACKGROUND OF THE INVENTION

Various types of radiation detection technologies are employed in radiation portal monitoring systems for screening and discovering illicit special nuclear material (SNM) in cargo by detecting neutrons and/or gamma-rays emitted by SNM, whether emitted spontaneously or induced with active interrogating beams.

For example, large organic plastic or liquid scintillators are commonly used in radiation portal monitors. While these devices have a relatively poor spectral response, they often rely on rate-based approaches, i.e. detecting an increase in the rate of incoming particles compared to background, which have been shown to be effective for detection. However, plastic organic scintillators are expensive to build in large volumes to approach $4\pi$ solid angle coverage of a cargo container and so are unlikely to be sensitive to neutron multiplicity. And liquid scintillators are often toxic and highly flammable. Ease of operation in the field and environmental/physical safety are important considerations of radiation portal monitoring operations. Most current radiation detectors however use materials that are either expensive, hazardous, or need to be operated at cryogenic temperatures.

There is therefore a need for a radiation detector technology capable of use in radiation portal monitoring that is simple, cost effective (thus highly scalable to large volumes) and safe, i.e. environmentally benign.

SUMMARY OF THE INVENTION

One aspect of the present invention includes a water Cerenkov-based neutron and high energy gamma ray detector comprising: an optically opaque enclosure surrounding a detection chamber filled with a Cerenkov radiator comprising water doped with a Gadolinium (Gd)-based compound; a plurality of photomultipliers optically connected to the detection chamber to measure Cerenkov radiation generated by the Cerenkov radiator from incident high energy gamma rays or gamma rays induced by neutron capture on the Gd of incident neutrons from a fission source; and means for determining time correlations in the detected Cerenkov radiation indicative of neutron multiplicity events characteristic of a fission source.

Another aspect of the present invention includes a water Cerenkov detector-based radiation portal monitoring system for detecting neutrons and high energy gamma rays emitted from fission sources, comprising: a plurality of compact water Cerenkov detector modules, each detector module comprising: an optically opaque enclosure surrounding a detection chamber filled with a Cerenkov radiator comprising water doped with a Gadolinium (Gd)-based compound; and a plurality of photomultipliers optically connected to the detection chamber to measure Cerenkov radiation generated by the Cerenkov radiator from incident high energy gamma rays or gamma rays induced by neutron capture on the Gd of incident neutrons from a fission source, wherein the compact water Cerenkov detector modules are arranged around a monitoring area to detect neutrons and high energy gamma rays emitted from said monitoring area; and means for determining time correlations in the detected Cerenkov radiation indicative of neutron multiplicity events characteristic of a fission source.

Generally, the present invention is directed to a water Cerenkov-based neutron and high energy gamma-ray detector, and a radiation portal monitoring system based on a modular arrangement of such water Cerenkov-based neutron and high energy gamma-ray detectors. Due to the fact that multiplicities of and time correlations between detected neutron particles are both powerful indicators of the presence of fissile material, the present invention provides an efficient and cost effective way to detect multiple simultaneous fission neutrons from Special Nuclear material (SNM) hidden within a cargo container.

Sensitivity to neutrons is enhanced in the present invention by the addition of a Gadolinium compound to the water (in low concentrations) used as the Cerenkov radiator. Gadolinium has a high thermal neutron capture cross-section, and Cerenkov light is produced in the Cerenkov radiator by an 8 MeV gamma-ray cascade following neutron capture on the Gadolinium. Water is non-toxic, non-flammable and inexpensive, and retains these properties even after doping in small amounts with Gadolinium or other neutron absorbing compounds. The water is preferably ultrapure and de-ionized and the Gadolinium-based compound may be for example $GdCl_3$.

The Gd-doped water, i.e. Cerenkov radiator, is contained in an optically opaque enclosure, and the Cerenkov photons are detected by an array of photomultipliers (e.g. photomultiplier tubes, PMTs) optically connected to the Cerenkov radiator (i.e. optically connected to a detection chamber filled with the Cerenkov radiator). The PMTs may be either individually shielded by a mu-metal cylinder and immersed in water (in which case a separate enclosure is used to contain the Gd-doped Cerenkov radiator), or shielded by a mu-metal shield surrounding the entire detector including the enclosure and PMTs (in which case a single enclosure filled with the Gd-doped Cerenkov radiator may be used since the mu-metal does not come in contact with the Gd). In one embodiment, the addition of highly reflective white walls surrounding the detection chamber housing the Cerenkov radiation makes it possible to detect gammas of a few MeV or more (e.g. at least 2 MeV) with a much smaller photocathode coverage of only about 10%. The photomultipliers are also connected to (or in the alternative considered a part of) a digital acquisition system (DAS) for performing digital conversion of the data sampled from the photomultipliers. The DAS has fast timing capability so that the time correlations between succeeding events can be measured. A data processor/analyzer may also be used to analyze and determine time correlations in the data indicative of neutron multiplicity. A small prototype water Cerenkov-based neutron and high energy gamma-ray detector was built and tested with a $^{252}$Cf fission source.

Furthermore, a plurality of the detector modules (when used in a radiation portal monitoring system) may be arranged to provide at least $4/3(\pi)$ solid angle coverage (ideally approaching $4\pi$ coverage) so as provide additional sensitivity to neutron multiplicity. Since the detector's primary constituent is water, it is highly scalable and permits large solid angle coverage. The large solid angle coverage (of and high intrinsic efficiency of this detection approach can provide robust and low cost neutron and gamma-ray detection with a single device, or in a modular system comprising a plurality of such devices. The time correlation may be used alone or in conjunction with rate increase detection, i.e. registering an increase in the raw count rate. Methods based on interrogation with neutron or gamma beams can also benefit from this type of mixed gamma-ray/neutron detector. For example, HEU can be induced to undergo fission due to bombardment by low energy neutrons or by high energy photonuclear induced fission. After fission is successfully induced, the resulting unstable nuclei can produce so-called 'β-delayed' gamma-rays above 3 MeV over several tens of seconds. These high energy gamma-rays should be detectable in the water Cerenkov-based neutron and high energy gamma ray detector of the present invention.

In an example embodiment, the detector consists of two acrylic tank volumes filled with different types of water. The first volume contains approximately 250 liters of ultra pure deionized water doped with 0.2% $GdCl_3$ and serves as an active "neutron detecting" region. The second contains approximately 50 liters of ultra pure deionized water and eight magnetically shielded 8 inch photo-multipliers (PMTs), oriented so that they look down into the active volume. The small 50 liter tank sits on top of the large 250 liter active volume tank. A flange/O-ring joint between the two tanks seals the volume of the lower tank, which was carefully filled to the top so that no air bubbles remained to interfere with the PMT field of view. A Gadolinium dopant was selected for two reasons; to take advantage of the very high thermal neutron capture cross-section, and to maximize the neutron detection probability via the resulting capture shower of gamma-rays summing to approximately 8 MeV. The 8 MeV gamma-ray shower can then be detected via Compton scattering of electrons in the water and consequent Cerenkov emission. The dopant $GdCl_3$ also has the advantage of being non-toxic in low concentrations. The enclosure/tank was fitted with a small expansion volume and airlock on the outside so that the target remained full of water and closed to the outside air despite ambient air pressure variations. The PMTs have a relatively high quantum efficiency at short wavelengths (~30% at 350 nm), which is particularly advantageous for Cerenkov light detection. The PMTs were shielded from the effects of nearby magnetic fields by individual cylinders of mu-metal, an alloy of very high magnetic permeability containing mostly nickel (~75%) and iron (~15%). The PMT water volume and the target volumes were separated to protect the $GdCl_3$ doped water from potential harmful effects of the mu-metal surface.

In another example embodiment, a single enclosure may be used containing the Gd-doped water, i.e. the Cerenkov radiator. In this case, a mu-metal shield is provided to surround the enclosure and the PMTs without coming in contact with the Gd.

BRIEF DESCRIPTION OF THE DRAWINGS

The accompanying drawings, which are incorporated into and form a part of the disclosure, are as follows.

DETAILED DESCRIPTION

Figure 1:
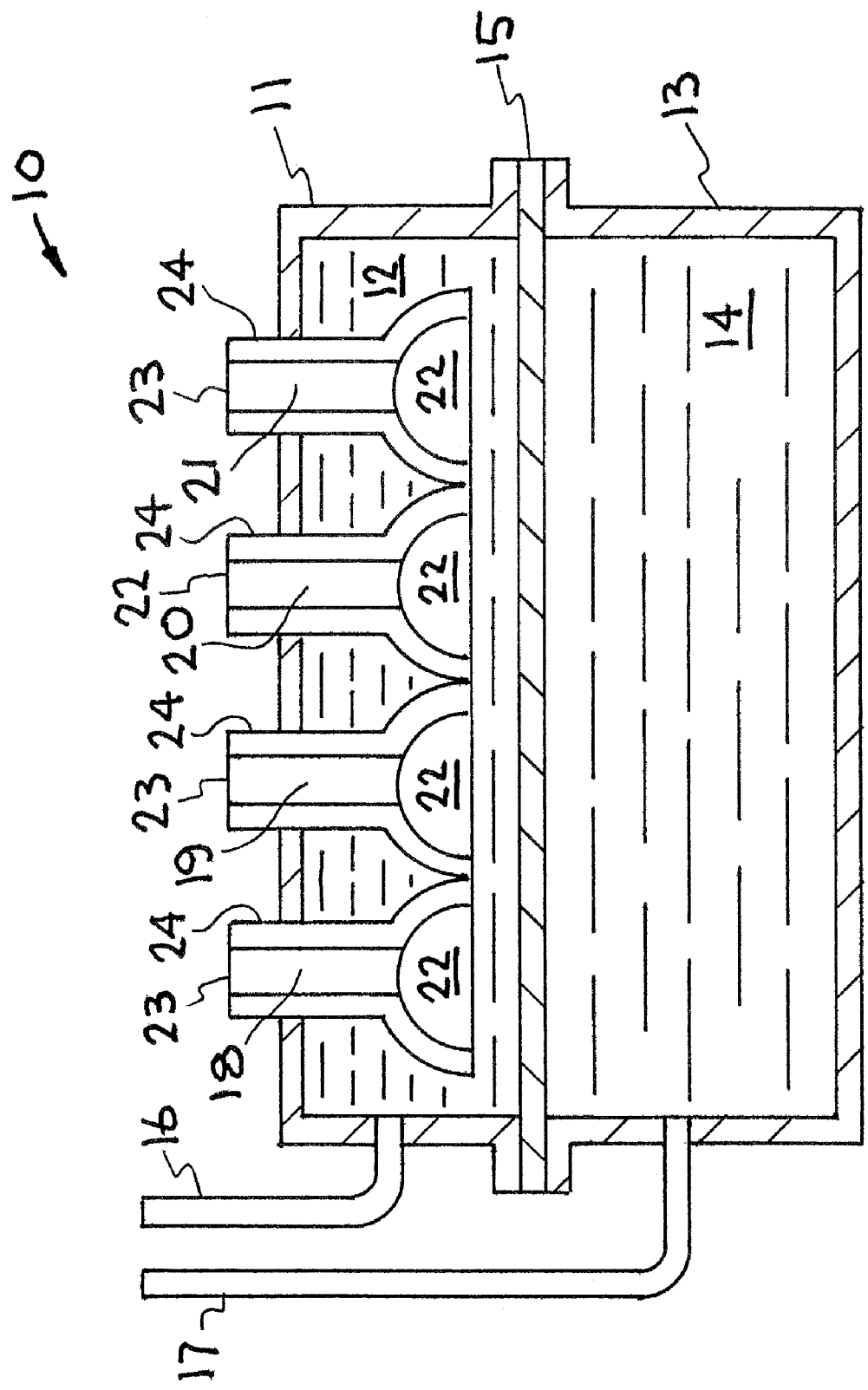
FIG. 1 is a schematic view of a first exemplary embodiment of water Cherenkov-based neutron and high energy gamma ray detector of the present invention having two separated enclosures, with only one containing Gd-doped water.

Turning now to the drawings, FIG. 1 shows a schematic view of a first exemplary embodiment of the water Cerenkov-based neutron and high energy gamma ray detector of the present invention, generally indicated at reference character 10, and having two separate enclosures or tanks 11 and 13. Enclosure 11 is the smaller one of the two and is shown sitting on top of the larger enclosure 13 and separated from enclosure 13 by an optically transparent divider 15. O-rings (not shown) may be provided between the two enclosures to seal the two enclosure volumes from each other. The detector has a relatively small compact size and footprint. For example, the lower enclosure 13 has been test constructed with dimensions 1 m×0.5 m×0.5 m, with a capacity of 250 liters.

The enclosure 13 forms the main active target volume/detector chamber 14 of the detector, which is filled with water doped with a Gadolinium-based compound, such as for example $GdCl_3$. Preferably, ultra pure, sterilized, de-ionized water is utilized. In an exemplary embodiment, only a small concentration of $GdCl_3$ is used, such as for example 0.2% $GdCl_3$ for a Gd concentration of 0.1%. The remarkably high neutron capture cross-section of Gadolinium at thermal energies (49,000 barns) means that, even with only 0.2% $GdCl_3$, the mean neutron capture time is reduced to about 30 μs from the 200 μs typical of pure water (neutron capture on hydrogen). In addition, neutron capture on Gadolinium results in a gamma cascade with total energy 7.9 MeV for $^{157}$Gd and 8.5 MeV for $^{155}$Gd, resulting in an increased probability of detection. The lower enclosure 13 may be fitted with a small expansion volume and airlock 17 so that the target volume/detection chamber 14 remains full (i.e. optically coupled to the detection chamber 12 of the upper enclosure 11) and closed to outside air despite ambient air pressure variations.

The upper enclosure 11 has a detection chamber 12 filled with water (again preferably ultra pure, sterilized and deionized) but without the Gd dopant. And four downward facing photomultiplier tubes (PMTs) 18-21 are shown extending into the detection chamber 12. In the test construction, eight 8 inch 9354 kb PMTs were used (available from Electron Tubes Ltd or ETL) having a relatively high quantum efficiency at short wavelengths (~30%). The PMTs face downwards toward the lower tank 13 with the photocathode ends 22 facing the lower tank 13 and opposite butt ends (PMT bases) 23 accessible from outside the enclosure 11. The PMTs are individually shielded from magnetic field effects by 8 inch diameter cylinders of mu-metal 24. The mu metal-shielded PMTs were separated from the GD-doped Cerenkov radiators in the target volume/detection chamber 14 to prevent exposure of the $GdC_{13}$ doped water to the mu-metal surface. Iron has been shown to react with $GdC_{13}$ in water, reducing the water clarity over time. Similar to the lower enclosure 13, the upper enclosure 11 may be fitted with a small expansion volume and airlock 16 so that the detection chamber 12 remains full and closed to outside air despite ambient air pressure variations.

The enclosures are optically opaque to prevent Cerenkov radiation from escaping the detection chambers. In the test construction the walls to the enclosures were constructed from UV transmitting acrylic, but covered on the outside with a reflective material, such a UV reflective 1073B Tyvek, a registered trademark of DuPont. A small air gap may exist between the acrylic wall and the Tyvek. In this manner, reflection inside the enclosures was achieved by a combination of total internal reflection off the acrylic/air gap boundary and UV reflective 1073B Tyvek. The reflectivity of this Tyvek has been measured previously and found to be approximately 90% and 70% in the blue and UV respectively. Light transmissivity of the UV transmitting acrylic drops approximately linearly from about 90% at 400 nm to 70% at 310 nm, then drops faster to zero at approximately 280 nm. Assuming a typical Cerenkov photon spectrum in water and the transmission and reflectivity values given above, it is estimated analytically that the use of UV transmitting acrylic increases the number of detected photons by an average of about 20% over regular acrylic. In an exemplary embodiment, the PMTs were arranged to achieve approximately 10% total PMT cathode coverage in the detector, enabled in part by the high reflectively in the detection chamber.

While not shown in FIG. 1 (but see FIG. 3), a digital acquisition system (DAS) is preferably connected to the PMTs to digitally process signals generated thereby. It is notable that the data collected by the DAS may be used to determine time correlations, either by directly plotting the data (manually or via computer processor), or in conjunction with a data processor/analyzer to analyze the data for time correlations in the measured Cerenkov radiation indicative of neutron multiplicity events characteristic of a fission source. Since time correlations in the measured Cerenkov radiation may be determined from either a plotting (manual or otherwise) of the data processed by the DAS, or by using a computer processor configured to produce the plotting or analyze the data, any of these methods and others are considered means for determining time correlations in the measured Cerenkov radiation indicative of neutron multiplicity events characteristic of a fission source.

In the test construction, the DAS was configured to handle the signals in the following way. The eight ETL 9354 kb PMTs were operated with positive HV. The anode was AC coupled and the signals sent to a pre-amp attached to the PMT base. The pre-amp signals were then routed to a 16 channel spectroscopy amplifier (CAEN N568B, available from Costruzioni Apparecchiature Elettroniche Nucleari or C.A.E.N.), which has two outputs per channel, a fast pulse and a shaped pulse. The shaped positive Gaussian pulse was sent to a peak sensing 12 bit analog to digital converter (ADC, CAEN V785), and the fast pulse to a low threshold 16 channel discriminator (CAEN V814). Each PMT discriminator threshold was set to trigger at approximately 0.5 photo-electrons. Digital signals from the discriminator were processed by a CAEN V1495 FPGA module, issuing a global trigger when any four channels triggered within 100 ns. At the issue of a global trigger, all 8 ADC channels were recorded to the internal 32 event buffer of the V785 together with the time since last trigger. To improve throughput, two V785 ADCs were used, with triggers being sent alternately to each ADC, so that while one was performing an analog to digital conversion, the other could accept a trigger. With this arrangement a live-time of about 75% was achieved with a trigger rate of 7 kHz due to the Cf source. The dead-time of this system is mainly due to the need to pause the DAS briefly every 64 events to empty the internal V785 buffers.

Figure 2:
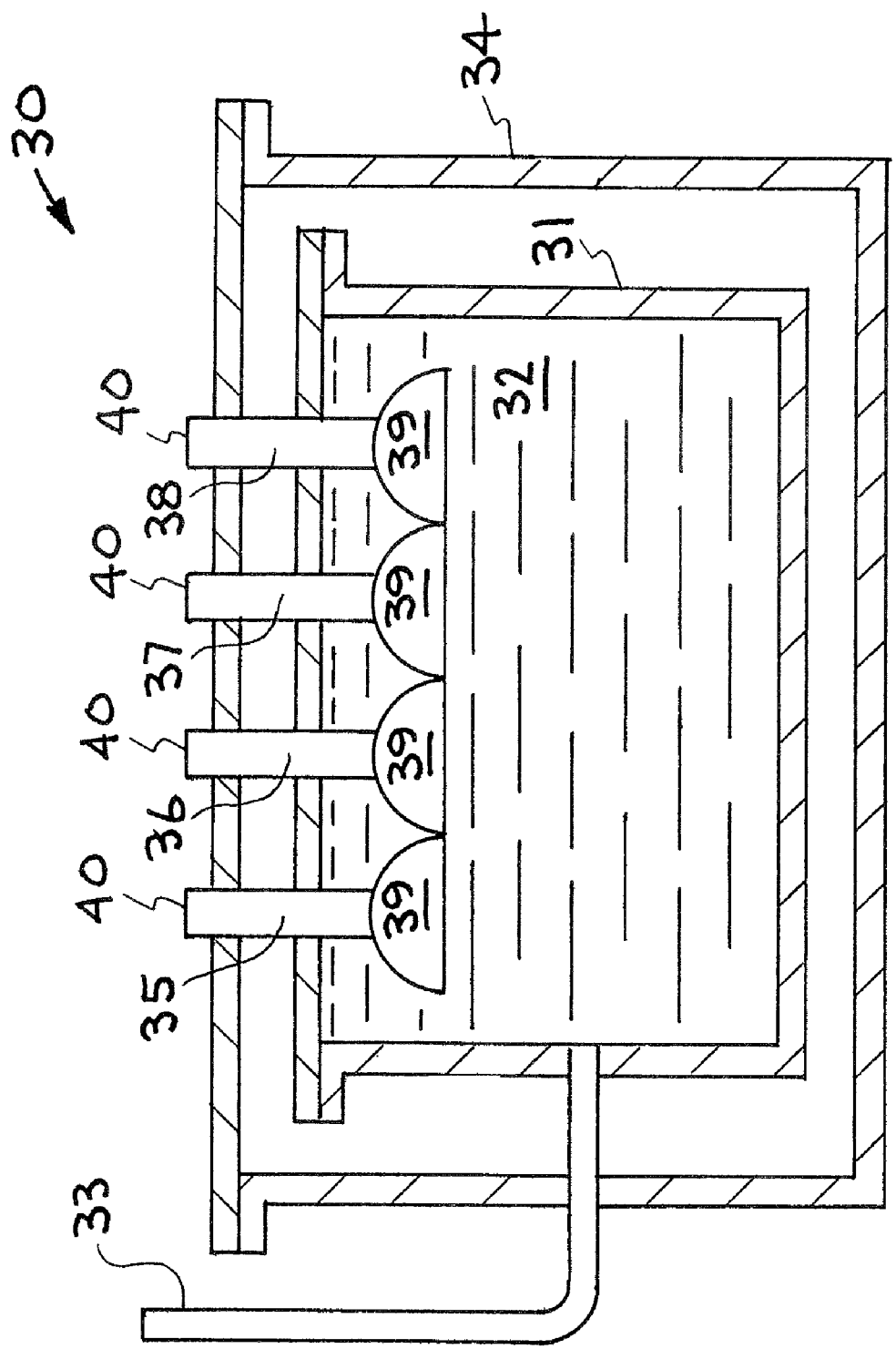
FIG. 2 is a schematic view of a second exemplary embodiment of water Cherenkov-based neutron and high energy gamma ray detector of the present invention having a single enclosure containing Gd-doped water.

FIG. 2 shows a second exemplary embodiment of the water Cerenkov-based neutron and high energy gamma-ray detector of the present invention, generally indicated at reference character 30, and having a single enclosure or tank 31. Similar to the first embodiment, enclosure 31 also preferably has a relatively small compact size and footprint. The enclosure 31 forms a single active target volume/detection chamber 32 of the detector, which is filled with water doped with a Gadolinium-based compound, such as for example $GdCl_3$, in all the same ways as detection chamber 14 of FIG. 1. A small expansion volume and airlock 33 is also shown fitted on the enclosure so that the target volume/detection chamber 31 remains full and closed to outside air despite ambient air pressure variations.

And four downward facing photomultiplier tubes (PMTs) 35-38 are shown extending into the detection chamber 12. Similar to FIG. 1, the PMTs face downwards into the tank 31 with the photocathode ends 39 immersed in the Cerenkov radiator and opposite butt ends (PMT bases) 40 accessible from outside the enclosure. In contrast to FIG. 1, the PMTs are not individually shielded from magnetic field effects with mu-metal cylinders. Instead a mu-metal shield 34 is provided surrounding both the PMTs and the enclosure, so that the mu metal does not come in contact with the GD-doped Cerenkov radiators in the target volume/detection chamber 32. Here too, the enclosure is optically opaque to prevent Cerenkov radiation from escaping the detection chambers. And while not shown, means for determining time correlations from the data is also preferably connected to the PMTs in a similar manner as described for FIG. 1.

Figure 3:
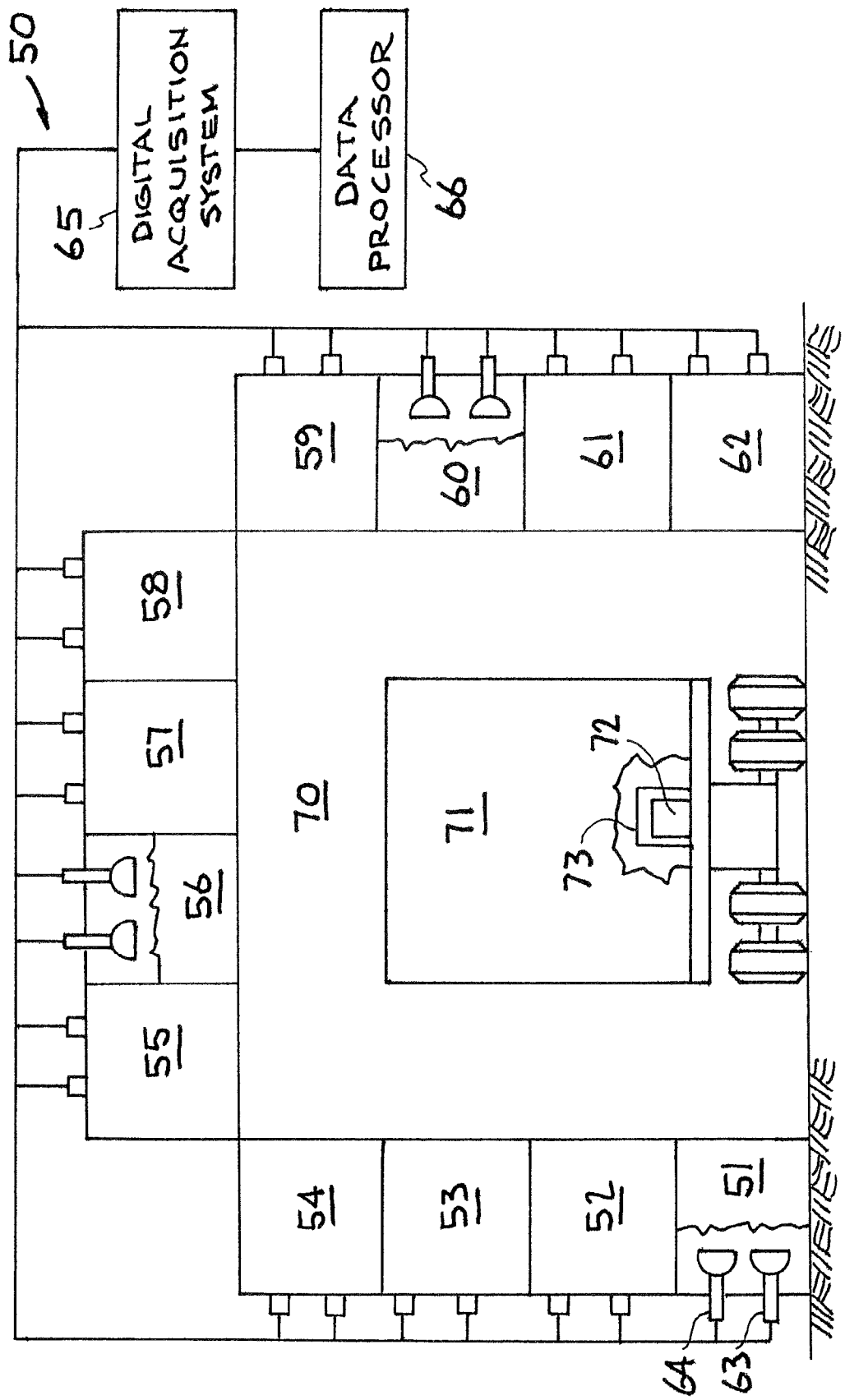
FIG. 3 is a schematic view of an exemplary embodiment of a radiation portal monitoring system based on the water Cherenkov-based neutron and high energy gamma ray detector of the present invention.

FIG. 3 shows an exemplary embodiment of a radiation portal monitoring system of the present invention, generally indicated at reference character 50, based on the water Cerenkov-based neutron and high energy gamma-ray detector described above. The system 50 is shown comprising a plurality of individual water Cerenkov-based neutron and high energy gamma ray detector modules 51-62, each having a construction as previously described. The modules 51-62 are shown particular arranged to surround an inspection/monitoring zone or area 70 shown with a cargo truck 71 having an SNM source 72 contained inside, and shielded with shielding 73. To enable and enhance neutron multiplicity sensitivity of the system, the modules are arranged to provide solid angle coverage ideally approaching 4π but not less than 4/3π. In particular, FIG. 3 schematically shows 2π solid angle coverage, with modules positioned above and on opposite sides of the monitoring zone. It is appreciated that to produce 4π coverage, additional modules may be placed (either permanently or temporarily) below the monitoring zone 70, as well as to the front of and behind the cargo truck 71. In any case, the photomultipliers of the respective modules (as represented by PMTs 64 and 65 of module 51) are connected to a digital acquisition system (DAS) 65 which provides digital processing of the signals generated from the PMTs. As previously described, the data collected by the DAS may be used to determine time correlations, either by directly plotting the data (manually or via computer processor), or in combination with a data processor/analyzer 66 which subsequently analyzes the data, for time correlations in the measured Cerenkov radiation indicative of neutron multiplicity events characteristic of a fission source. Any of these methods and others are considered means for determining time correlations in the measured Cerenkov radiation indicative of neutron multiplicity events characteristic of a fission source.

EXPERIMENTAL RESULTS

Figure 4:
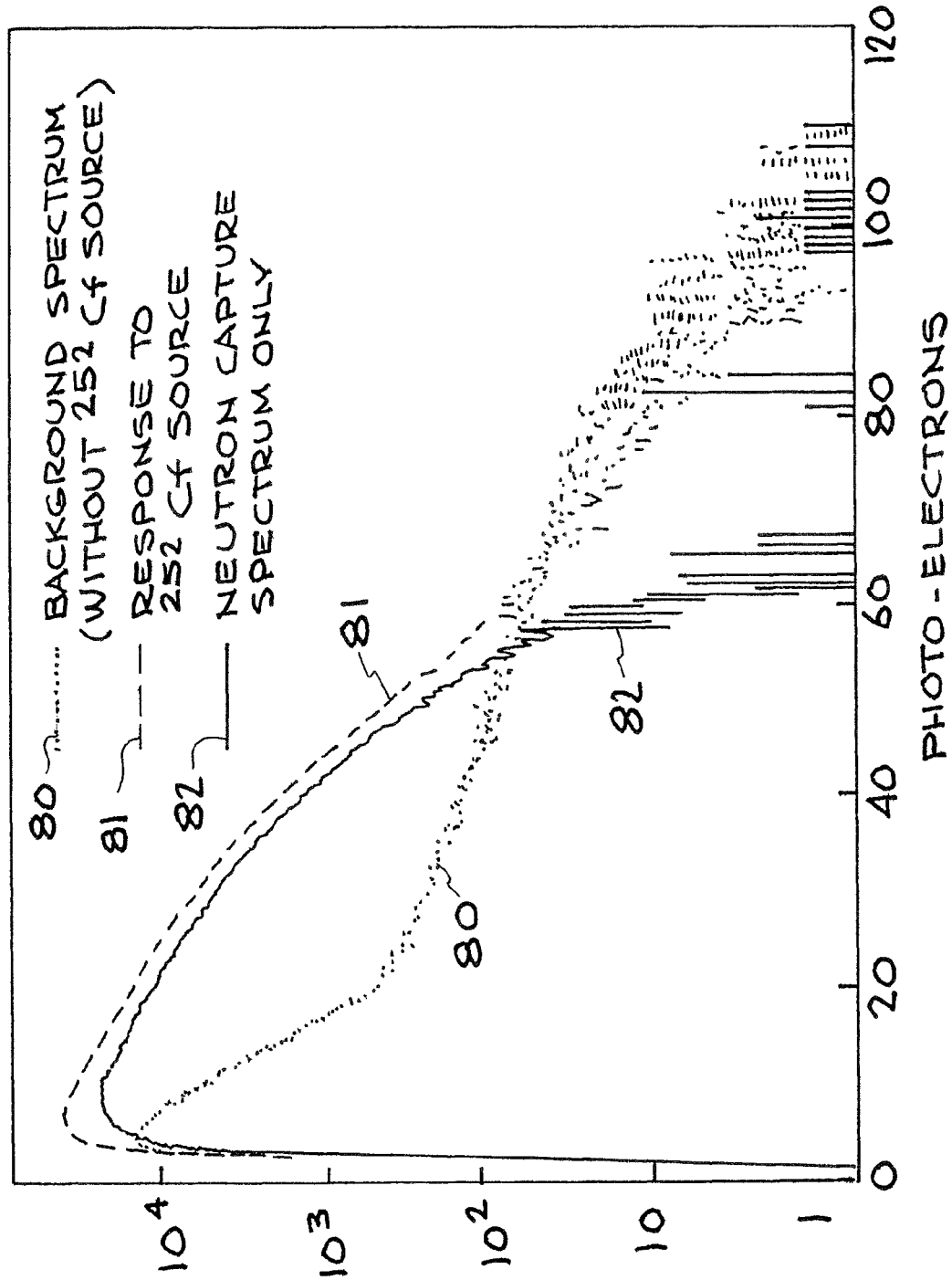
FIG. 4 is a graph of a detector response spectrum produced in experiments conducted for the first exemplary embodiment of FIG. 1.

FIGS. 4-7 show experimental results of tests conducted to determine the capability of the first embodiment 10 of the water Cerenkov-based neutron and high energy gamma-ray detector to detect both high energy gammas and neutron capture. A fission source ($^{252}$Cf, 55 μCi or 2.4×10$^5$ neutrons/s) was placed on the concrete floor of the testing laboratory approximately 1 meter from the detector behind a two inch lead wall. FIG. 4 shows the summed PMT response from all eight PMTs. The dotted line 80 shows the background spectrum without the Cf source present, the dashed line 81 shows the detector response spectrum with the Cf source present, and the solid line 82 shows the neutron capture spectrum only. The raw event rate increased from 700 Hz to 7.4 kHz due to the presence of the source alone. The data rate written to disk was 5.6 kHz, due to the dead time of 25%. The integration time was approximately one hour. Despite the poor energy resolution characteristic to the technique, it is obvious from the figure that the presence of a $^{252}$Cf source changes the spectral shape, increasing the high energy (>10 photo-electrons) component relative to the background. The figure also indicates that if a lower background signal is required, some improvement in signal to noise may be possible with a modest energy cut.

Figure 5:
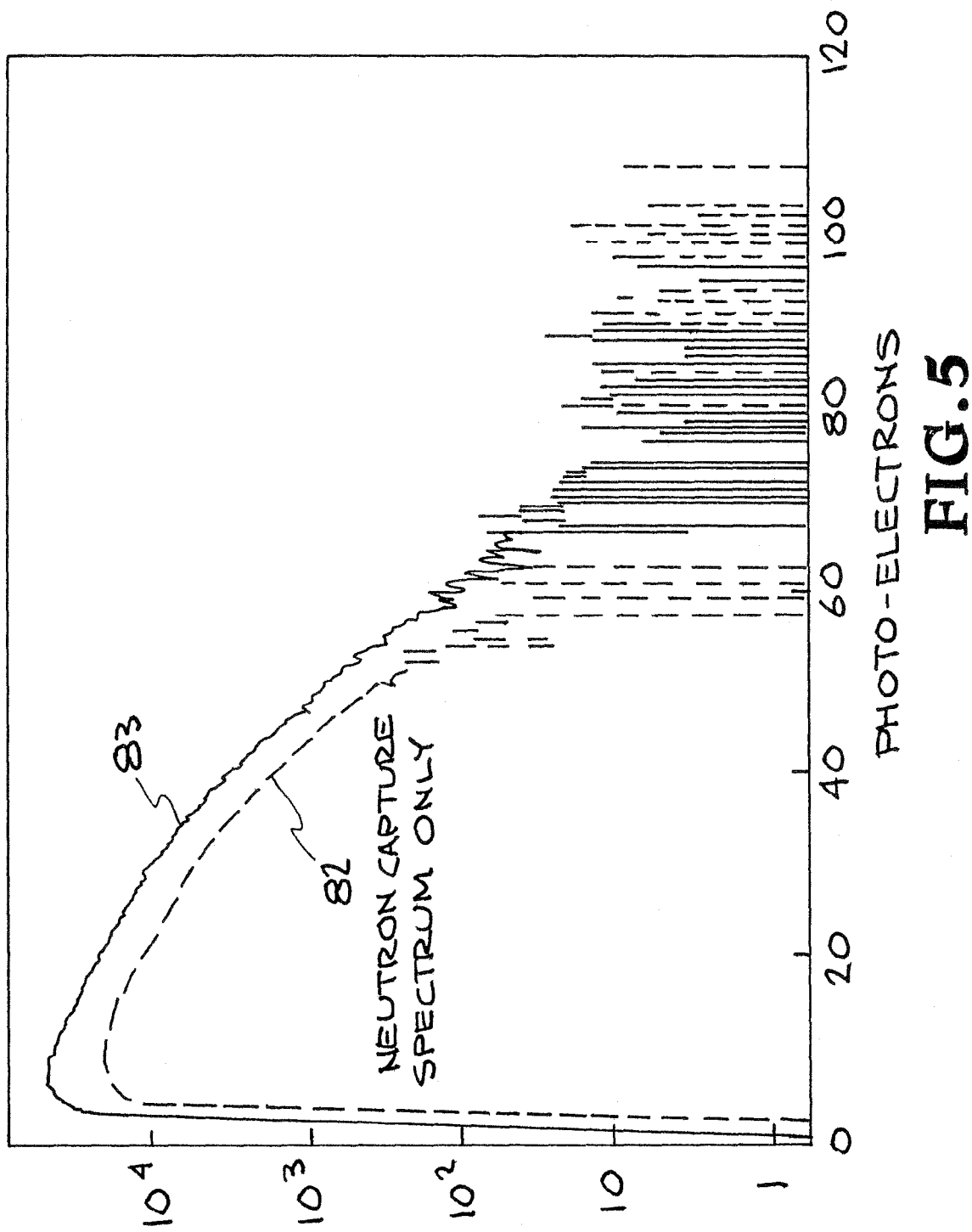
FIG. 5 is a graph of a detector response spectrum produced in the experiments conducted for the first exemplary embodiment of FIG. 1, and in particular showing the statistically subtracted spectrum of pure neutron capture events.
Figure 6:
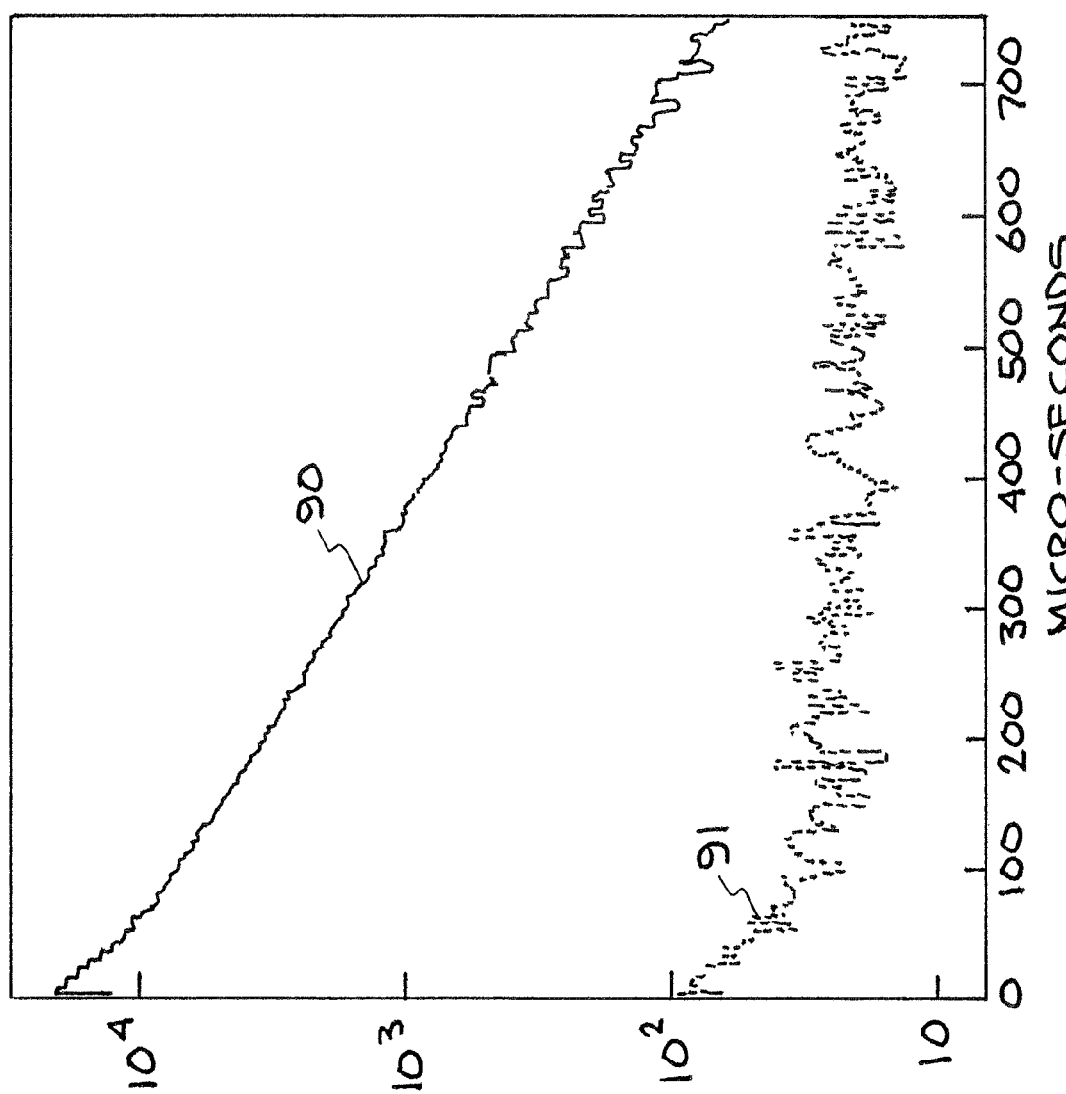
FIG. 6 is a graph of the inter-event time distribution produced in the experiments conducted for the first exemplary embodiment of FIG. 1, and in particular showing the resultant distributions with and without the presence of a $^{252}$Cf source.
Figure 7:
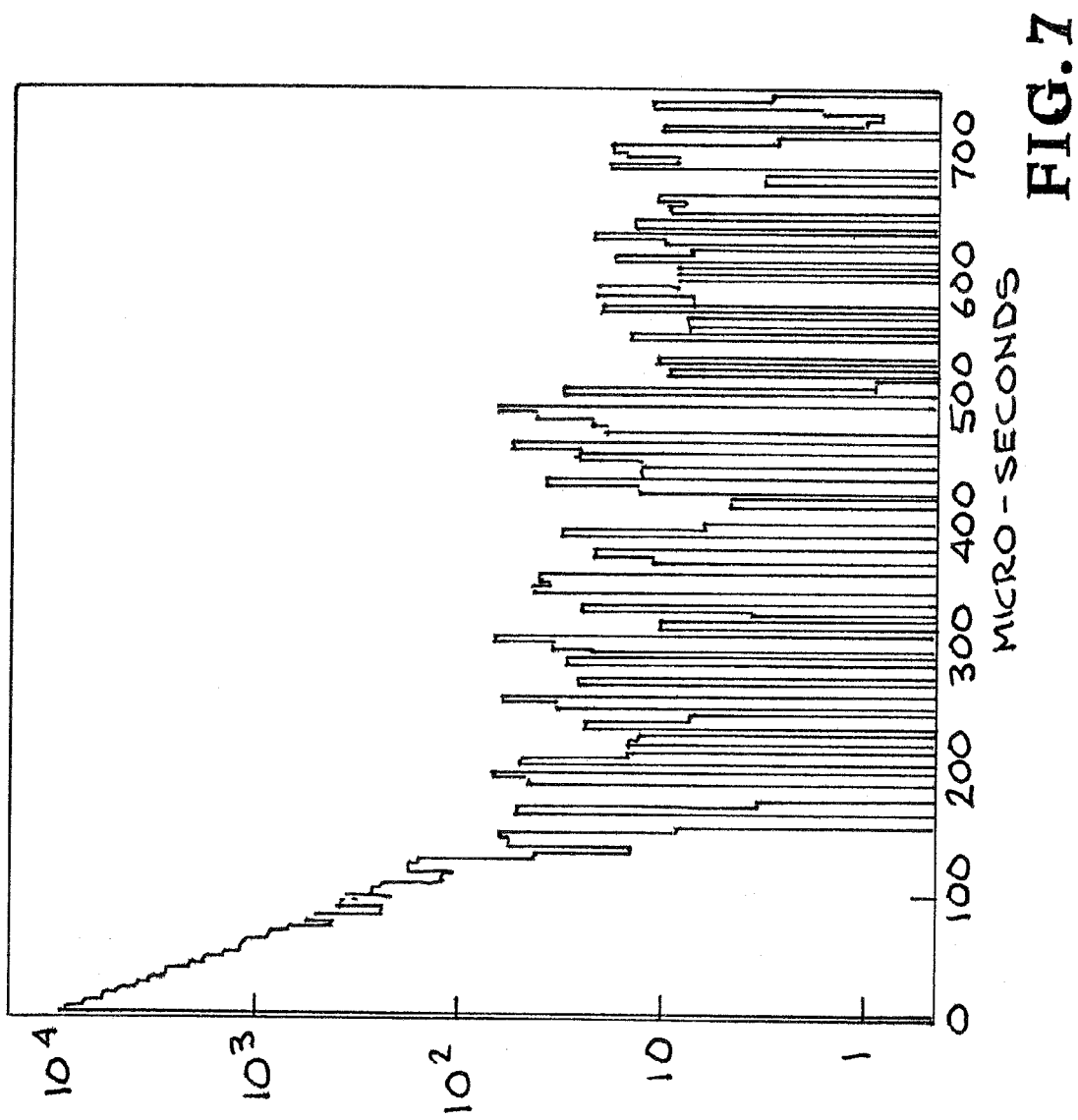
FIG. 7 is a graph of the inter-event time distribution produced in the experiments conducted for the first exemplary embodiment of FIG. 1, and in particular showing the residuals that result when the random events which were fitted by an exponential curve are subtracted, leaving only the correlated component with a mean inter-event time of 28 us.

To test whether some of the signal that results from the $^{252}$Cf source is due to neutron capture, the inter-event time between consecutive events was plotted as shown in FIG. 6, which shows a plot of the inter-event time distribution. In particular, line 90 shows the resultant distributions with the presence of a $^{252}$Cf source, and line 91 shows the resultant distributions without the presence of a $^{252}$Cf source. The source results in an increase in both the random trigger rate and the correlated trigger rate. And FIG. 7 shows the residuals that result when the random events which were fitted by an exponential curve are subtracted, leaving only the correlated component with a mean inter-event time of 28 us. Assuming Poisson statistics, the primary exponential due to uncorrelated events in the presence of the $^{252}$Cf source gives a corresponding event rate of 7 kHz. By subtracting this exponential, what remains is a correlated component at small inter-event times, which can be fit by another exponential, corresponding to a mean inter-event time of 28 μs. The 28 μs component agrees quite well with the expected mean neutron capture time in water or liquid scintillator for a gadolinium concentration of 0.1% (GdCl$_3$ concentration of 0.2%). The correlated component can be a result of either the detection of a prompt gamma ray followed by a delayed neutron capture or a prompt neutron capture followed by a delayed neutron capture (where both particles were emitted in the same fission event in both cases). There is also a smaller correlated neutron capture signal present when there is no $^{252}$Cf source present. This is due to spallation caused by the passage of muons near the detector and muon capture nearby, both of which may result in coincident gammas and neutrons, or multiple neutrons, and hence a correlation. As such, this provides persuasive evidence for neutron detection in the detector of the present invention on the strength of the correlated signals in FIGS. 6 and 7 and the change in shape of the energy spectrum in the presence of the $^{252}$Cf in FIG. 4. By employing a statistical subtraction technique, it is possible to extract the spectral shape of the neutron capture events as shown by line 82 in FIG. 5. This was extracted by taking the spectrum of a selection of $^{252}$Cf events correlated with a prompt signal (<100 μs). Line 83 in FIG. 5 represents the spectrum of a pure sample of a $^{252}$Cf source. The spectrum dashed curve 80 in FIG. 4 contained a combination of neutron capture events, fission gammas and background gamma-rays from the local environment. The spectrum of a normalized selection of uncorrelated $^{252}$Cf events (>100 us since previous event) was then subtracted. The number of uncorrelated $^{252}$Cf events subtracted was calculated by fitting an exponential to all the uncorrelated events (>100 μs) in the presence of the $^{252}$Cf source and calculating the area under the line of best fit between 0 and 100 μs. The remaining events reveal the spectral shape of a pure sample of correlated neutron capture events. As such, it can be seen that upon exposure of the detector to a $^{252}$Cf source, a clear signature consistent with neutrons is observed. A correlated signal in the inter-event time distribution is also observed, again consistent with previous experiments with Gd concentration at the 0.1% level. The origin of this signal is the detection of correlated gamma-ray/neutron or neutron/neutron pairs originating from $^{252}$Cf fissions.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. A water Cerenkov-based neutron and high energy gamma ray detector comprising:
    an optically opaque enclosure surrounding a detection chamber filled with a Cerenkov radiator comprising water doped with a Gadolinium (Gd)-based compound;
    a plurality of photomultipliers optically connected to the detection chamber to detect Cerenkov radiation generated by the Cerenkov radiator from incident high energy gamma rays or gamma rays induced by neutron capture on the Gd of incident neutrons from a fission source wherein the photomultipliers are immersed in the water doped with the Gd-based compound;
    mu-metal shielding surrounding the enclosure and the photomultipliers to shield the photomultipliers from magnetic fields; and
    means for determining time correlations in the detected Cerenkov radiation indicative of neutron multiplicity events characteristic of a fission source.

2. The detector of claim 1,
wherein the Gd-based compound is GdCl$_3$.

3. The detector of claim 2,
wherein the water is doped with about 0.2% GdCl$_3$.

4. The detector of claim 1,
wherein the detection chamber is lined with a reflective material and photocathode coverage of the photomultipliers is at least about 10%.

5. A water Cerenkov-based neutron and high energy gamma ray detector comprising:
an optically opaque enclosure surrounding a detection chamber filled with a Cerenkov radiator comprising water doped with a Gadolinium (Gd)-based compound;
a second optically opaque enclosure surrounding a second detection chamber filled with water not doped with a Gd-based compound, and an optically transparent divider separating the two detection chamber;
a plurality of photomultipliers optically connected to the detection chamber to detect Cerenkov radiation generated by the Cerenkov radiator from incident high energy gamma rays or gamma rays induced by neutron capture on the Gd of incident neutrons from a fission source, wherein the photomultipliers are individually shielded by mu-metal shielding, with the mu-metal shielded photomultipliers immersed in the water not doped with the Gd-based compound in the second detection chamber; and
means for determining time correlations in the detected Cerenkov radiation indicative of neutron multiplicity events characteristic of a fission source.

6. The detector of claim 5,
wherein the Gd-based compound is GdCl$_3$.

7. The detector of claim 6,
wherein the water is doped with about 0.2% GdCl$_3$.

8. The detector of claim 5,
wherein the detection chamber is lined with a reflective material and photocathode coverage of the photomultipliers is at least about 10%.

9. A water Cerenkov detector-based radiation portal monitoring system for detecting neutrons and high energy gamma rays emitted from fission sources, comprising:
a plurality of compact water Cerenkov detector modules, each detector module comprising: an optically opaque enclosure surrounding a detection chamber filled with a Cerenkov radiator comprising water doped with a Gadolinium (Gd)-based compound; and a plurality of photomultipliers optically connected to the detection chamber to detect Cerenkov radiation generated by the Cerenkov radiator from incident high energy gamma rays or gamma rays induced by neutron capture on the Gd of incident neutrons from a fission source, wherein the compact water Cerenkov detector modules are arranged around a monitoring area to detect neutrons and high energy gamma rays emitted from said monitoring area, and wherein for each detector module, the photomultipliers are immersed in the water doped with the Gd-based compound;
mu-metal shielding surrounding the enclosure and the photomultipliers to shield the photomultipliers from magnetic fields; and
means for determining time correlations in the detected Cerenkov radiation indicative of neutron multiplicity events characteristic of a fission source.

10. The radiation portal monitoring system of claim 9,
wherein the detector modules are arranged to provide at least $4/3(\pi)$ solid angle coverage of the monitoring area.

11. The radiation portal monitoring system of claim 9,
wherein the detector modules are arranged so that photocathodes of the photomultipliers face the monitoring area.

12. The radiation portal monitoring system of claim 9,
wherein the Gd-based compound is GdCl$_3$.

13. The radiation portal monitoring system of claim 12,
wherein the water is doped with about 0.2% GdCl$_3$.

14. The radiation portal monitoring system of claim 9,
wherein for each detector module, the detection chamber of each detector module is lined with a reflective material and photocathode coverage of the photomultipliers is at least about 10%.

15. A water Cerenkov detector-based radiation portal monitoring system for detecting neutrons and high energy gamma rays emitted from fission sources, comprising:
a plurality of compact water Cerenkov detector modules, each detector module comprising: an optically opaque enclosure surrounding a detection chamber filled with a Cerenkov radiator comprising water doped with a Gadolinium (Gd)-based compound, a second optically opaque enclosure surrounding a second detection chamber filled with water not doped with a Gd-based compound, an optically transparent divider separating the two detection chambers, and a plurality of photomultipliers optically connected to the detection chamber to detect Cerenkov radiation generated by the Cerenkov radiator from incident high energy gamma rays or gamma rays induced by neutron capture on the Gd of incident neutrons from a fission source, wherein the photomultipliers are individually shielded by mu-metal shielding, with the mu-metal shielded photomultipliers immersed in the water not doped with the Gd-based compound in the second detection chamber, and wherein the compact water Cerenkov detector modules are arranged around a monitoring area to detect neutrons and high energy gamma rays emitted from said monitoring area; and
means for determining time correlations in the detected Cerenkov radiation indicative of neutron multiplicity events characteristic of a fission source.

16. The radiation portal monitoring system of claim 15,
wherein the detector modules are arranged to provide at least $4/3(\pi)$ solid angle coverage of the monitoring area.

17. The radiation portal monitoring system of claim 15,
wherein the detector modules are arranged so that photocathodes of the photomultipliers face the monitoring area.

18. The radiation portal monitoring system of claim 15,
wherein the Gd-based compound is GdCl$_3$.

19. The radiation portal monitoring system of claim 18,
wherein the water is doped with about 0.2% GdCl$_3$.

20. The radiation portal monitoring system of claim 15,
wherein for each detector module, the detection chamber of each detector module is lined with a reflective material and photocathode coverage of the photomultipliers is at least about 10%.

* * * * *